(12) United States Patent
Moens et al.

(10) Patent No.: US 6,660,398 B1
(45) Date of Patent: Dec. 9, 2003

(54) POWDER THERMOSETTING COMPOSITIONS FOR PREPARING COATINGS WITH LOW GLOSS FINISH

(75) Inventors: Luc Moens, Sint-Genesius-Rode (BE); Kris Buysens, Oudenaarde (BE); Daniel Maetens, Brussels (BE)

(73) Assignee: UCB, S.A., Brussels (BE)

( * ) Notice: Subject to any disclaimer, the term of this patent is extended or adjusted under 35 U.S.C. 154(b) by 0 days.

(21) Appl. No.: 09/581,685

(22) PCT Filed: Dec. 16, 1998

(86) PCT No.: PCT/BE98/00200

§ 371 (c)(1),
(2), (4) Date: Aug. 9, 2000

(87) PCT Pub. No.: WO99/32567

PCT Pub. Date: Jul. 1, 1999

(30) Foreign Application Priority Data

Dec. 18, 1997 (BE) .............................................. 9701039

(51) Int. Cl.$^7$ ..................... B32B 27/18; B32B 27/26; B32B 27/36

(52) U.S. Cl. ................ 428/482; 428/480; 525/165; 525/173; 525/174; 528/297; 528/302; 528/303; 528/305; 528/307; 528/308; 528/308.6; 427/189; 427/195

(58) Field of Search .................. 428/480, 482; 525/173, 174, 165; 528/303, 297, 305, 308, 308.6, 302, 307; 427/180, 189, 195

(56) References Cited

U.S. PATENT DOCUMENTS

| 3,842,035 A | 10/1974 | Klaren |
| 5,182,337 A | * 1/1993 | Pettit et al. .................. 525/176 |
| 5,264,529 A | 11/1993 | Nozaki et al. |
| 5,373,084 A | * 12/1994 | Chang .......................... 528/272 |
| 5,436,311 A | 7/1995 | Hoebeke et al. |
| 5,525,370 A | 6/1996 | Hoebeke et al. |
| 6,184,311 B1 | * 2/2001 | O'Keeffe et al. ........... 525/438 |

FOREIGN PATENT DOCUMENTS

| WO | WO 91/14745 | 10/1991 |
| WO | WO 94/02552 | 2/1994 |
| WO | WO 97/20895 | 6/1997 |

OTHER PUBLICATIONS

Nippon Ester Co., Ltd., Patent Abstract of JP 63 154,771, (1998) from Derwent Info Ltd. (Abstract Only).
CIBA Geigy AG, Patent Abstract of EP 366,608, (1990) of Derwent Info Ltd. (Abstract Only).

* cited by examiner

*Primary Examiner*—Vivian Chen
(74) *Attorney, Agent, or Firm*—Finnegan, Henderson, Farabow, Garrett & Dunner, LLP

(57) ABSTRACT

The invention concerns powder thermosetting coating compositions comprising (a) an amorphous polyester containing carboxyl groups, rich in isophthalic acid and neopentylglycol, optionally branched with a polycarboxylic acid or a polyol containing at least three functional groups; (b) a semicrystalline polyester containing carboxyl groups prepared from one or several saturated aliphatic dicarboxylic acids with linear chain, and from a saturated aliphatic diol with linear or cyclic chain optionally branched with a polycarboxylic acid or with a polyol containing at least three functional groups, and having a melting point (Tm) of at least 40° C. and an acid value of 5 to 50 mg of KOH/g, and (c) a cross-linking agent. Said compositions are useful for preparing powder paints and varnishes providing excellent quality coatings whereof the brilliance, measured at an angle of 60°, according to the ASTM D 523 standard is always less than 50%, that is half-gloss or matt coatings.

22 Claims, No Drawings

POWDER THERMOSETTING COMPOSITIONS FOR PREPARING COATINGS WITH LOW GLOSS FINISH

This application is a national stage filing of International Application No. PCT/BE98/00200, filed Dec. 16, 1998, the content of which is incorporated herein by reference. This application claims benefit of priority under 35 U.S.C. §119 to Belgian patent application no. 9701039, filed on Dec. 18, 1997, the content of which is also incorporated by reference herein.

DESCRIPTION

The present invention relates to thermosetting powder compositions comprising, as binder, a blend of an amorphous polyester, of a semicrystalline polyester and of a crosslinking agent, which compositions provide, by curing, low-gloss coatings, particularly matt coatings.

The invention also relates to the use of these compositions for the preparation of powder paints and varnishes which provide low-gloss coatings, as well as to the low-gloss coatings obtained from these compositions.

At the present time, thermosetting powder coating compositions are widely employed as paints and varnishes in order to form durable protective coatings on the most varied of objects. Powder coating compositions have many advantages over coating compositions that are in the form of solutions in an organic solvent; on the one hand, the safety and environmental problems caused by solvents are completely eliminated and, on the other hand, whereas solvent-based coating compositions have the drawback of only being able to be used partially—in certain types of application, only 60% or less of the coating composition applied comes into contact with the substrate and that part which does not come into contact with the substrate cannot be recovered—power coating compositions are used 100%, given that only the powder in direct contact with the substrate is retained by the latter, the excess powder being, in principle, entirely recoverable and reusable. This is why these powder compositions are preferred over coating compositions that are in the form of solutions in an organic solvent.

Powder coating compositions generally contain a thermosetting organic binder and, optionally, fillers, pigments, catalysts and various additives for tailoring their behaviour to their use.

These thermosetting powders are prepared in the following manner. The polyester or polyesters, the crosslinking agent, the optional catalyst, the pigments, the fillers and other additives are dry blended at ambient temperature in the required proportions in order to obtain a powder paint or varnish. The blend thus obtained is put into an extruder in order to produce melt homogenization therein at a temperature generally between 80 and 150° C. The blend leaving the extruder is left to cool and then ground and screened in order to obtain a powder having the desired particle size of between 10 and 150 micrometres.

The powder paints and varnishes thus obtained are applied in a manner known per se by means of an electrostatic or triboelectric spray gun or using the technique of fluidized-bed deposition on the object to be coated. The object thus coated is then heated in an oven where the melting and crosslinking of the binder is carried out at high temperature.

The cured coatings obtained from thermosetting powder coating compositions must have a smooth, uniform and defect-free appearance and must especially be free of any "orange peel"; they must have good mechanical and chemical properties and good weatherability.

Furthermore, it is essential that the powder coating compositions remain in the form of freely-flowing powders for a long enough period after their manufacture and their packaging, without reagglomerating during transportation and storage.

The thermosetting powder coating compositions commonly used and commercially available contain, as binder, a blend of an amorphous polyester containing carboxyl or hydroxyl groups having a glass transition temperature ($T_g$) of between 45 and 80° C. with a cross-linking agent having functional groups capable of reacting with the carboxyl or hydroxyl groups of the polyester.

The amorphous polyesters used in these compositions are those obtained from aromatic dicarboxylic acids, such as terephthalic acid or isophthalic acid, and optionally from aliphatic dicarboxylic acids, such as adipic acid, and from various polyols, such as neopentylglycol, ethylene glycol, trimethylolpropane, etc.

These amorphous polyester-based compositions are storage-stable and produce coatings of excellent quality, inter alia a surface without any visible defects, and good mechanical properties. Among these compositions, amorphous polyester-based compositions rich in isophthalic acid provide coatings which are highly valued for their excellent performance in outdoor exposure.

However, after curing, these amorphous polyester-based compositions provide coatings with a very high gloss. The gloss, measured at an angle of 60°, according to the ASTM D 523 standard, is very often greater than 90%.

Powder coating compositions whose binder contains a semicrystalline polyester have also already been proposed.

Thus, in European Patent 521,992, the binder proposed consists of a blend of at least one semi-crystalline polyester having an acid number of 10 to 70 mg of KOH per gramme and of at least one amorphous polyester having a glass transition temperature ($T_g$) of at least 30° C. and an acid number of 15 to 90 mg of KOH per gramme, with a crosslinking agent which may be an epoxidized compound, a compound containing activated thiol or hydroxyl groups or an oxazoline.

Semicrystalline polyesters are characterized by one or more glass transition temperatures ($T_g$) not exceeding 55° C. and a sharp melting point of 50 to 200° C.

According to that patent, semicrystalline polyesters differ from amorphous polyesters by the fact that semicrystalline polyesters have a heterogeneous morphology (they contain a mixture of phases), are opaque and white in colour at ambient temperature, have a low melt viscosity, are more insoluble in organic solvents and have a very high structural regularity. The semicrystalline polyesters described and used in the illustrative embodiments of that patent are those obtained by polycondensation from dicarboxylic acids containing an aromatic or aliphatic ring, such as terephthalic acid and 1,4-cyclohexanedicarboxylic acid, and from saturated aliphatic diols with a linear chain, such as 1,6-hexanediol and 1,10-decanediol; further-more, aliphatic dicarboxylic acids with a linear chain, such as adipic acid, succinic acid or 1,12-dodecanedioic acid, are added thereto. The amorphous polyesters used are polyesters containing carboxyl groups usually employed in powder paints and varnishes; these polyesters may be rich in isophthalic acid for the purpose of obtaining outdoor coatings having good weatherability.

According to that patent, the presence of the semicrystalline polyester in the binder gives a coating having an excellent overall appearance, free of "orange peel", and improved mechanical properties.

However, as shown in Table I at the end of the description of that patent, the coatings obtained from these compositions all have a very high gloss; the gloss, measured at an angle of 60°, according to the ASTM D 523 standard, may vary between 82 and 87%.

U.S. Pat. No. 5,373,084 proposes thermo-setting powder coating compositions which comprise, as binder, a blend of a particular semicrystalline polyester, of an amorphous polyester and of a cross-linking agent. The particular semicrystalline polyesters proposed in that patent are those obtained by the esterification of a saturated aliphatic dicarboxylic acid having a linear chain, mainly 1,12-dodecanedioic acid, with a saturated aliphatic diol having a linear chain, mainly 1,6-hexanediol, and by optionally incorporating a trifunctional polyol, such as trimethylolpropane or glycerol, or a trifunctional polycarboxylic acid, such as trimellitic acid, in order to obtain branched polyesters. These semicrystalline polyesters have an acid number or hydroxyl number of approximately 20 to 120, preferably approximately 30 to 80 mg of KOH per gramme and a melting point of 40 to 200° C., preferably 60 to 150° C. The amorphous polyesters used are amorphous polyesters containing conventional hydroxyl or carboxyl groups; these polyesters preferably have a glass transition temperature ($T_g$) of at least 50° C. and an acid number or hydroxyl number of approximately 25 to 80 mg of KOH per gramme. However, it will be noted that the only amorphous polyesters described and used in that patent are amorphous polyesters rich in terephthalic acid, the acid constituent of which contains at least 50 mol % of terephthalic acid and the alcohol constituent of which contains at least 50 mol % of neopentylglycol and up to 10 mol % of trimethylolpropane; on the other hand, amorphous polyesters rich in isophthalic acid are not mentioned in that patent.

The particular semicrystalline polyesters proposed in that patent act above all as reactive plasticizers. In the illustrative embodiments, it is shown that when the powder composition contains a small amount of the plasticizing semicrystalline polyester (at most 10% by weight calculated with respect to the total weight of the amorphous and semicrystalline polyesters), the composition provides coatings having improved properties, in this case a smooth appearance with little "orange peel", a gloss measured at an angle of 60°, according to the ASTM D 523 standard, of 96 to 97%, a good pencil hardness and excellent mechanical properties. However, just like European Patent 521,992 mentioned above, U.S. Pat. No. 5,373,084 does not disclose the possibility of obtaining coatings having a low gloss, for example coatings whose gloss measured at an angle of 60°, according to the ASTM D 523 standard, would be less than 50%.

However, there is an increasing need to be able to have available thermosetting powder paints and varnishes which provide coatings having a low gloss, such as, for example, satin or semi-gloss coatings or matt coatings, which can be used inter alia for the coating of certain accessories in the motor-vehicle industry, such as wheel rims, bumpers, etc., or else for the coating of metal beams and panels used in the construction industry.

Various methods have already been proposed for obtaining powder paints and varnishes which provide coatings having a low gloss. However, experience has shown that it is difficult to produce a paint or varnish capable of providing, under the usual extrusion and curing conditions, a matt or satin finish completely reliably and reproducibly. According to one of these methods, one or more special flatting agents, such as silica, talc, chalk and metal salts, are introduced into the powder composition in addition to the binder and the conventional pigments. However, the reduction in gloss is often insufficient and a pronounced deterioration of the properties of the paint coatings is observed, such as, for example a lack of adhesion to metal substrates. In order to remedy these drawbacks, European Patent 165,207 proposes to incorporate waxes, for example a polyolefin wax, and metal salts (for example, zinc 2-benzothiazolethiolate) into thermosetting powder compositions based on polyesters terminated by carboxyl groups and on epoxidized compounds, such as triglycidyl isocyanurate. Likewise, U.S. Pat. No. 4,242,253 proposes, as additives, calcium carbonate and finely divided polypropylene particles in order to produce low-gloss coatings. The drawback of this system is that the inorganic fillers, often incorporated in large amounts, may damage the extruders used for preparing the powders and impair the desired surface appearance of the coating obtained, which often has a rough and irregular appearance. Moreover, the waxes that are added easily migrate to the surface, thereby causing unacceptable variations in the degree of mattness of the coating as it undergoes natural ageing. Furthermore, the fact of having to add additional fillers in large amounts incurs an extra expense and, in itself, constitutes a drawback.

According to U.S. Pat. No. 3,842,035, it is known to produce a matt finish by using a coating composition obtained by dry blending two thermosetting powder compositions which were extruded separately. One of them is a slowly-curing composition (a long gel time) and the other a rapidly-curing composition (a short gel time). Using this system, it is possible, after curing, to obtain a matt coating without it being necessary to add a special matting agent to the powder composition. The major drawback of this system is that it requires dry blending large amounts of already-formulated powders, something which is not easy to do, especially on an industrial scale. In addition, as this blending cannot be carried out continuously, but only in batches of powder, it is not easy to obtain the same degree of mattness in the coatings when going from one batch of powder to another. Finally, the powder which is recovered after a first spraying operation and reused as paint cannot have the same composition as the powder had during the first spraying operation, thereby also resulting in a change in the degree of mattness obtained.

There are also other systems that are intended to obtain matt coatings in which two polymers of different nature or reactivity are used, as well as one or more crosslinking agents, so as to induce two distinct crosslinking mechanisms, or two very different reaction rates. In these systems, the powder is prepared in a single step, unlike the process described in U.S. Pat. No. 3,842,035. It is then possible to produce, in a single extrusion operation, a powder paint or varnish capable of forming coatings of very low gloss.

By way of example, Japanese Patent Application 154,771/88 describes a resin composition for a matt powder paint comprising a blend of a branched polyester containing hydroxyl groups having a high hydroxyl number and of another polyester containing hydroxyl groups having a lower hydroxyl number, in defined amounts, and a blocked isocyanate as crosslinking agent. This composition provides a matt coating having good mechanical properties and good weatherability. International Patent Application WO 92/01756 describes powder coating compositions comprising a blend containing together (1) a semicrystalline polyester containing hydroxyl groups having a hydroxyl number of 20 to 100, (2) an amorphous polyester containing hydroxyl groups having a hydroxyl number of 20 to 120, (3) an acrylic polymer containing hydroxyl groups and (4) a blocked polyisocyanate as crosslinking agent. The semicrystalline polyesters used are those whose acid constituent contains from 85 to 95 mol % of terephthalic acid and from 5 to 15 mol % of 1,4-cyclohexane-dicarboxylic acid and whose alcohol constituent contains an aliphatic diol with a linear chain.

Using these compositions, low-gloss coatings (the gloss, measured at an angle of 60°, according to the ASTM D 523 standard, does not exceed 35%) having good mechanical properties and good pencil hardness are obtained. European Patent Application 366,608 describes powder paints, obtained by extrusion, which provide matt coatings, but these paints contain two cross-linking agents. These powder paints contain an epoxy resin, particularly the diglycidylether of bisphenol A, a polycarboxylic acid, such as, for example, 2,2,5,5-tetra(β-carboxyethyl)-cyclopentanone as the first crosslinking agent, and a saturated polyester terminated by carboxyl groups, tolylbiguanide or dicyandiamide as the second crosslinking agent.

Finally, the use of active compounds in two different reaction systems for producing matt coatings is described, for example, in European Patent 104,424. That patent proposes the preparation of a powder by using only a single extrusion. This powder contains, as binder, both a resin containing hydroxyl groups, such as a polyester containing hydroxyl groups, and a polyepoxidized compound, such as triglycidyl isocyanurate, and it contains a special crosslinking agent which, in its molecule, includes both carboxyl groups (in order to react with the epoxidized compound) and blocked isocyanate groups (in order to react with the resin containing hydroxyl groups).

The main disadvantage of powder paints and varnishes obtained from an extrusion described in the abovementioned patents is that the properties of the powders obtained are very sensitive to variations in the extrusion conditions, such as the extrusion temperature, the shear gradient, etc., and, since it is not easy to control these conditions precisely, it is difficult to always produce coatings having the same degree of mattness from a well-defined composition. In particular, the problem is to find a composition which, under the usual extrusion conditions, produces a low-gloss coating in a completely reliable and reproducible manner.

European Patent 551,064 proposes to solve this problem by using thermosetting powder coating compositions which contain, as binder, a blend of a linear polyester containing carboxyl groups having an acid number of between 20 and 50 mg of KOH per gramme and of an acrylic copolymer containing glycidyl groups obtained from 5 to 30% by weight of glycidyl acrylate or methacrylate and from 70 to 95% by weight of methyl methacrylate. These powder compositions make it possible to obtain coatings of good quality having a very low gloss. This is because the gloss, measured at an angle of 60°, according to the ASTM D 523 standard, is always less than 15%. Furthermore, these matt coatings have a smooth surface without any defects, good adhesion to metal surfaces and excellent weatherability. In addition, the properties of these powders are only slightly sensitive to variations in the extrusion conditions or are insensitive to them, which means that a defined composition practically always produces a matt coating having substantially the same degree of mattness.

However, it has turned out that the matt coatings obtained from these compositions do not withstand mechanical deformations, given that the mechanical properties of these coatings are insufficient, in particular the direct impact strength and reverse impact strength.

In conclusion, it may be seen that the various powder compositions proposed hitherto for obtaining low-gloss coatings all still have a certain number of drawbacks.

There therefore still remains a need to have available thermosetting powder compositions capable of producing low-gloss coatings that do not have the defects of the compositions of the prior art.

According to the present invention, it has been surprisingly discovered that using, as binder, a blend of an amorphous polyester containing carboxyl groups, rich in isophthalic acid, and of a semicrystalline polyester containing carboxyl groups which is prepared more particularly from a saturated aliphatic dicarboxylic acid with a linear chain and from a saturated aliphatic diol with a linear or cyclic chain, and of an appropriate crosslinking agent, it is possible to obtain thermosetting powder compositions which are capable of producing low-gloss coatings in a completely reliable and reproducible manner and which have good mechanical properties and excellent weatherability.

The subject of the present invention is therefore thermosetting powder coating compositions comprising, as binder, a blend of an amorphous polyester, of a semicrystalline polyester and of a crosslinking agent, which are characterized in that the binder comprises:

(a) an amorphous polyester containing carboxyl groups, rich in isophthalic acid, prepared from an acid constituent comprising from 55 to 100 mol % of isophthalic acid, from 0 to 45 mol % of at least one dicarboxylic acid other than isophthalic acid and from 0 to 10 mol % of a polycarboxylic acid containing at least 3 carboxyl groups and from an alcohol constituent comprising from 60 to 100 mol % of neopentylglycol, from 0 to 40 mol % of at least one dihydroxylated compound other than neopentyl-glycol and from 0 to 10 mol % of a polyhydroxylated compound containing at least 3 hydroxyl groups, the said amorphous polyester having a glass transition temperature $T_g$) of at least 50° C. and an acid number of 15 to 100 mg of KOH/g;

(b) a semicrystalline polyester containing carboxyl groups prepared either (b1) from a saturated aliphatic dicarboxylic acid with a linear chain having from 4 to 16 carbon atoms and from a saturated aliphatic diol with a linear chain having from 2 to 16 carbon atoms and optionally from a poly-carboxylic acid containing at least 3 carboxyl groups or from a polyol containing at least 3 hydroxyl groups, or (b2) from 40 to 100 mol % of a saturated aliphatic dicarboxylic acid with a linear chain having from 10 to 16 carbon atoms and from 0 to 60 mol % of an aliphatic dicarboxylic acid with a linear chain having from 4 to 9 carbon atoms, calculated with respect to the total of the dicarboxylic acids, from a cycloaliphatic diol having from 3 to 16 carbon atoms and optionally from a polycarboxylic acid having at least 3 carboxyl groups or from a polyol having at least 3 hydroxyl groups, the said semicrystalline polyesters having a melting point ($T_m$) of at least 40° C. and an acid number of 5 to 50 mg of KOH/g; and (c) a crosslinking agent.

The amorphous polyesters containing carboxyl groups, rich in isophthalic acid, that are used in the compositions according to the invention are polyesters having a high isophthalic acid content commonly used in powder paint and varnish formulations for the production of coatings which exhibit excellent outdoor exposure performance.

According to the invention, the acid constituent of these amorphous polyesters rich in isophthalic acid must contain at least 55 mol % of isophthalic acid and it may even consist completely of isophthalic acid (100 mol %).

The acid constituent of these amorphous polyesters may furthermore contain up to 45 mol % of an aromatic, aliphatic or cycloaliphatic dicarboxylic acid, other than isophthalic acid, such as terephthalic acid, phthalic acid, succinic acid, glutaric acid, adipic acid, pimelic acid, suberic acid, azelaic acid, sebacic acid, fumaric acid, maleic acid, 1,3-cyclohexanedicarboxylic acid, 1,4-cyclohexanedicarboxylic acid and mixtures of these compounds and up to 10 mol % of a polycarboxylic acid containing at least 3 carboxyl groups, such as trimellitic acid or pyromellitic acid. These acids may be used in the form of the free acid or, if required, in the form of the anhydride, or else in the form of an ester with a lower aliphatic alcohol.

The alcohol constituent of these amorphous polyesters must contain at least 60 mol % of neopentylglycol and it may even consist entirely of neopentylglycol (100 mol %). The alcohol constituent of these amorphous polyesters may furthermore contain up to 40 mol % of an aliphatic, cycloaliphatic or aromatic dihydroxylated compound, other than neopentylglycol, such as ethylene glycol, propylene glycol, 1,4-butanediol, 1,6-hexanediol, 2-methyl-1,3-propanediol, 2-butyl-2-ethyl-1,3-propanediol, 1,4-cyclohexanedimethanol, hydrogenated bisphenol A, neopentylglycol hydroxypivalate and mixtures of these compounds and up to 10 mol % of a polyhydroxylated compound containing at least 3 hydroxyl groups, such as trimethylolpropane, di-trimethylolpropane, pentaerythritol and mixtures thereof.

The amorphous polyesters containing carboxyl groups, rich in isophthalic acid, which may be used according to the invention have an acid number of 15 to 100 mg of KOH per gramme, preferably 30 to 70 mg of KOH per gramme, and have a glass transition temperature ($T_g$) which is at least 50° C. so that the polyesters remain solid at the storage temperature (20 to 50° C.), and which preferably varies from 50 to 80° C. The number-average molecular weight ($\overline{M}_n$) of these amorphous polyesters is between 1100 and 11,500 and preferably between 1600 and 8500. The melt viscosity (measured using a cone-and-plate viscometer according to the ASTM D 4287-88 standard) of these amorphous polyesters may vary from 100 to 15,000 mPa·s at 200° C.

The semicrystalline polyesters containing carboxyl groups used in the compositions according to the invention are semicrystalline polyesters having a particular chemical constitution. They may be chosen from two types of polyesters, (b1) and (b2). The polyesters (b1) are prepared by polyesterification of a saturated aliphatic dicarboxylic acid with a linear chain having from 4 to 16 carbon atoms with a saturated aliphatic diol having from 2 to 16 carbon atoms. Preferably, these polyesters are linear, but branched polyesters may also be used in which the branching is introduced by means of a polycarboxylic acid containing at least 3 carboxyl groups, such as trimellitic acid or pyromellitic acid, or of a polyol such as trimethylol-propane, di-trimethylolpropane and pentaerythritol, these compounds being used in an amount ranging from 0 to 10 mol % with respect to all the monomers together.

Examples of saturated aliphatic dicarboxylic acids with a linear chain which may be used are succinic acid, glutaric acid, pimelic acid, suberic acid, azeleic acid, sebacic acid and 1,12-dodecanedioic acid. These acids may be used as a mixture, but they are preferably used by themselves. 1,12-Dodecanedioic acid is the preferred acid. Examples of saturated aliphatic diols with a linear chain which may be used are ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol and 1,16-hexadecanediol. These diols may be used as a mixture, but they are preferably used by themselves. It is preferred to use 1,6-hexanediol.

The semicrystalline polyesters (b2) are prepared from 40 to 100 mol % of a saturated aliphatic dicarboxylic acid with a linear chain having from 10 to 16 carbon atoms and from 0 to 60 mol % of a saturated aliphatic dicarboxylic acid with a linear chain having from 4 to 9 carbon atoms, calculated with respect to all of these dicarboxylic acids together. It is also possible to use from 40 to 95 mol % of the acid having from 10 to 16 carbon atoms and from 5 to 60 mol % of the acid having from 4 to 9 carbon atoms. The alcohol constituent of these polyesters is a cycloaliphatic diol having from 3 to 16 carbon atoms. Preferably, these polyesters are linear but it is also possible to use branched polyesters in which the branching is introduced by means of a polycarboxylic acid containing at least 3 carboxyl groups, such as trimellitic acid or pyromellitic acid, or of a polyol such as trimethylol-propane, di-trimethylolpropane and pentaetythritol. These compounds having at least 3 functions are used in an amount ranging from 0 to 10 mol % with respect to all of the monomers involved in the polyester composition.

Examples of saturated aliphatic dicarboxylic acids with a linear chain having from 10 to 16 carbon atoms are 1,10-decanedioic acid, 1,11-undecanedioic acid, 1,12-dodecanedioic acid, 1,13-tridecanedioic acid, 1,14-tetradecanedioic acid, 1,15-pentadecanedioic acid and 1,16-hexadecanedioic acid. Preferably, 1,12-dodecanedioic acid is used, by itself or in a mixture.

Examples of saturated aliphatic dicarboxylic acids with a linear chain having from 4 to 9 carbon atoms which may be used are succinic acid, glutaric acid, pimelic acid, suberic acid and azelaic acid. These acids may be used in a mixture but they are preferably used by themselves. Examples of cycloaliphatic diols having from 3 to 16 carbon atoms which may be used are 1,4-cyclohexanediol, 1,4-cyclohexanedimethanol, hydrogenated bisphenol A, 2,2,4,4-tetramethyl-1,3-cyclobutanediol and 4,8-bis (hydroxymethyl) tricyclo [5.2.1.0 $^{2,6}$] decane.

These diols may be used in a mixture, but they are preferably used by themselves. It is preferred to use 1,4-cyclohexanediol or cyclohexanedimethanol.

The semicrystalline polyesters containing carboxyl groups which may be used according to the invention have an acid number of 5 to 50 mg of KOH per gramme, preferably 5 to 30 mg of KOH per gramme; preferably, these polyesters have a hydroxyl number which does not exceed 5 mg of KOH per gramme.

These semicrystalline polyesters are solid substances at ambient temperature, characterized by a melting point ($T_m$) of between 40 and 90° C.

The number-average molecular weight ($\overline{M}_n$) of these semicrystalline polyesters is between 2200 and 25,000 and preferably between 2800 and 11,220. The melt viscosity (measured using a cone-and-plate viscometer according to the ASTM D 4287-88 standard) of these semicrystalline polyesters may vary from 50 mPa·s at 100° C to 10,000 mPa·s at 150° C.

It has been surprisingly found that only the thermosetting powder compositions containing both an amorphous polyester rich in isophthalic acid and a particular semicrystalline polyester prepared by polyesterification of a saturated aliphatic dicarboxylic acid having a linear chain with a saturated aliphatic diol having a linear or cycloaliphatic chain, such as those described in detail above, are capable of providing low-gloss or matt coatings having good mechanical properties and excellent weatherability. This is because it has been observed that powders which have an identical composition but in which the amorphous polyester rich in isophthalic acid is replaced by an amorphous polyester rich in terephthalic acid, of the type of those described and used in U.S. Pat. No. 5,373,084 give, after curing, a coating having a very high gloss (Comparative Example I). Likewise, it has been observed that powders which have an identical composition but in which the particular semicrystalline polyester according to the invention is replaced by a semicrystalline polyester that is not according to the invention, of the type of those described and used in European Patent 521,992 and essentially based on terephthalic acid and 1,6-hexanediol also give, after curing, a coating having a very high gloss (Comparative Examples II and III).

The amorphous polyesters rich in isophthalic acid and the semicrystalline polyesters used according to the invention are prepared by the conventional methods of synthesizing polyesters, using an excess of acid with respect to the alcohol so as to obtain a polyester containing carboxyl groups having the desired acid number.

The amorphous polyesters containing carboxyl groups, rich in isophthalic acid, may be prepared by one-stage or two-stage methods of synthesis. In the latter case, in the first stage, a polyester containing hydroxyl groups is prepared from, on the one hand, isophthalic acid and, optionally, one or more other polycarboxylic acids other than isophthalic acid (or their functional derivatives) and from, on the other hand, an excess of neopentylglycol and, optionally, one or more other dihydroxylated and/or polyhydroxylated compounds and, in the second stage, the polyester containing hydroxyl groups thus obtained is esterified with an appropriate dicarboxylic acid, preferably isophthalic acid, in order to obtain an amorphous polyester containing carboxyl groups, rich in isophthalic acid.

The semicrystalline polyesters containing carboxyl groups are generally prepared using a one-stage process from an appropriate aliphatic or cycloaliphatic diol and from an excess of the appropriate aliphatic dicarboxylic acid, optionally incorporating a polycarboxylic acid or a polyol into the reaction mixture if it is desired to obtain a branched semicrystalline polyester.

The synthesis of these polyesters is generally carried out in a conventional reactor fitted with a stirrer, with an influx of inert gas (for example, nitrogen), with a distillation column connected to a condenser and with a thermometer attached to a temperature controller.

The esterification conditions are conventional, namely that a standard esterification catalyst may be used, either a tin derivative, such as dibutyltin dilaurate, dibutyltin oxide or n-butyltin trioctanoate, or a titanium derivative, such as tetrabutyl titanate, in an amount ranging from 0.01 to 1% by weight of the reactants. To this may optionally be added an antioxidant of the phenolic type, such as Irganox 1010 (sold by Ciba-Geigy), by itself or in a mixture with a stabilizer, such as, for example tributyl phosphite, in an amount ranging from 0.01 to 1% by weight of the reactants.

The polyesterification is generally carried out at a temperature which is gradually increased from approximately 130° C. to approximately 180 to 250° C., firstly under normal pressure and then under reduced pressure, maintaining this temperature until the formation of a polyester having the desired hydroxyl number and/or acid number. When a two-stage process is used to prepare the amorphous polyesters rich in isophthalic acid, the reaction mixture containing the polyester containing hydroxyl groups that was obtained in the first stage is left to cool down to 200° C., the desired amount of dicarboxylic acid is added, the temperature is raised to 230–240° C. and this temperature is maintained firstly under normal pressure and then under reduced pressure, until the formation of an amorphous polyester containing carboxyl groups having the desired acid number.

The degree of esterification is monitored by determining the amount of water formed during the reaction and the properties of the polyester obtained, for example the acid number, the hydroxyl number, the molecular weight, the glass transition temperature ($T_g$), the melting point $T_m$) and the melt viscosity.

At the end of the synthesis, when the polyester is still in the molten state, a crosslinking catalyst, known per se, may optionally be added to it in an amount ranging from 0.01 to 1.5% by weight of the polyester. These catalysts may be of the amine type, such as 2-phenylimidazoline, of the phosphine type, such as triphenylphosphine, or ammonium or phosphonium salts, such as tetrapropylammonium chloride, tetrabutylammonium bromide, benzyltriphenylphosphonium chloride or ethyltriphenylphosphonium bromide. Next, the polyester is removed from the reactor and cast as a thick layer, left to cool and ground into particles having an average size ranging from a fraction of an mm to several mm.

The amorphous polyester containing carboxyl groups, rich in isophthalic acid, the semicrystalline polyester containing carboxyl groups and the crosslinking agent together form the basic binder for the thermosetting powder coating compositions according to the invention.

In the thermosetting powder coating compositions according to the invention, the amount of amorphous polyester rich in isophthalic acid generally represents approximately 60 to 87% by weight and the amount of semicrystalline polyester approximately 13 to 40% by weight calculated with respect to the total weight of the amorphous polyester and of the semicrystalline polyester. However, it has been observed that the gloss, measured at an angle of 60° C. according to the ASTM D 523 standard, of the coatings obtained decreases when the amount of amorphous polyester decreases and the amount of semicrystalline polyester increases. This is why, in the compositions according to the invention, the amount of amorphous polyester rich in isophthalic acid preferably represents 60 to 82% by weight and the amount of semicrystalline polyester preferably represents 18 to 40% by weight calculated with respect to the total weight of the amorphous polyester and of the semicrystalline polyester.

The crosslinking agents which may be used in the compositions according to the invention are all organic compounds having functional groups capable of reacting with the carboxyl groups of the polyesters in order to crosslink the binder. Typical crosslinking agents are, for example, polyepoxidized compounds and β-hydroxyalkylamides. Particularly preferred cross-linking agents are triglycidyl isocyanurate (ARALDITE PT 810 sold by Ciba-Geigy), the 75/25 mixture of diglycidyl terephthalate and of triglycidyl trimellitate (ARALDITE PT 910 sold by Ciba-Geigy), acrylic copolymers containing glycidyl groups, such as GMA 252 sold by Estron, and bis(N,N-dihydroxyethyl)-adipamide (PRIMID XL 552 sold by EMS).

In the thermosetting powder coating compositions according to the invention, the ratio of the amount of amorphous polyester and of semicrystalline polyester containing carboxyl groups, on the one hand, to the amount of crosslinking agent, on the other hand, is such that there are from 0.5 to 1.5 equivalents of carboxyl groups per equivalent of functional groups (for example, epoxy groups) in the crosslinking agent.

It is preferred to use the crosslinking agent in an amount of approximately 4 to 25% by weight calculated with respect to the total weight of the binder.

The powder coating compositions according to the invention therefore generally contain, as binder, (a) from 45 to 83% by weight of amorphous polyester rich in isophthalic acid, (b) from 13 to 30% by weight of semicrystalline polyester and (c) from 4 to 25% by weight of crosslinking agent, and preferably (a) from 45 to 78% by weight of amorphous polyester rich in isophthalic acid, (b) from 18 to 30% by weight of semicrystalline polyester and (c) from 4 to 25% by weight of crosslinking agent.

The present invention also relates to the use of the thermosetting powder coating compositions according to the invention for the preparation of powder paints and varnishes that provide low-gloss coatings, preferably matt coatings, as well as to the powder paints and varnishes obtained using these compositions.

The powder paints and varnishes according to the invention may be prepared by mixing in a homogeneous manner the amorphous polyester rich in isophthalic acid, the semi-crystalline polyester and the crosslinking agent with the various auxiliary substances conventionally used for the manufacture of powder paints and varnishes.

This homogenization is carried out, for example, by firstly dry blending, at ambient temperature, the amorphous polyester, the semi-crystalline polyester, the crosslinking agent and the various auxiliary substances in a mixer, for example a drum mixer, and by then passing the blend thus obtained through an extruder, for example a single-screw extruder of the Buss-Ko-Kneter type or a twin-screw extruder of the PRISM or A.P.V. type in order to produce melt homogenization therein at a temperature lying within the range 80 to 150° C. The extrudate is then left to cool, ground and screened in order to obtain a powder whose particle size is between 10 and 150 micrometres.

If desired, the amorphous polyester rich in isophthalic acid and the semicrystalline polyester may be melt blended beforehand in the synthesis reactor or in an extruder, such as a Betol BTS 40 extruder, before they are added in the form of a blend to the other ingredients of the composition for the dry blending at ambient temperature. However, it is more convenient to add the two polyesters separately to the other ingredients of the powder composition.

The auxiliary substances which may be added to the thermosetting powder coating compositions are, for example, pigments and colorants, such as titanium dioxide, iron oxides, zinc oxide, etc., metal hydroxides, metal powders, sulphides, sulphates, carbonates, silicates, such as ammonium silicate for example, carbon black, talc, kaolins, barytes, iron blues, lead blues, organic reds, organic browns, etc., flow-regulating agents, such as RESIFLOW PV5 (from Worlee), MODAFLOW (from Monsanto) or ACRONAL 4F (from BASF), and air-release agents, such as benzoin, etc. These auxiliary substances are used in the usual amounts, it being understood that if the thermosetting compositions according to the invention are used as varnishes the addition of opacifying substances will be omitted. It is also possible to add compounds that absorb ultraviolet radiation, such as TINUVIN 900 from Ciba-Geigy and sterically hindered amine-based light stabilizers, such as TINUVIN 144 from Ciba-Geigy.

The subject of the present invention is also a process for obtaining a low-gloss coating on an article, in which process a thermosetting powder coating composition according to the invention, as described above, is applied to the said article and the article thus coated is cured at a high temperature for a time long enough to completely crosslink the coating.

The thermosetting powder coating compositions may be applied to articles of various shapes and sizes, in particular to articles made of glass, of ceramic and of metal, such as steel and aluminium, using techniques known per se for depositing powders, that is to say by using a spray gun in an electrostatic field in which the powder is charged under a voltage of 30 to 100 kV by a high-voltage direct current, or by using a triboelectric spray gun in which the powder is charged by friction, or else by the well-known technique of fluidized-bed deposition.

After they have been applied to the article in question, the deposited powders are oven-cured at a temperature of between 140 and 200° C. for a time which may be as long as 30 minutes in order to melt the powder particles, to form a homogeneous skin, which spreads perfectly over the substrate, and finally to achieve complete crosslinking and curing of the coating.

The thermosetting powder coating compositions according to the present invention allow coatings to be obtained which have a low gloss. This is because the gloss, measured at an angle of 60° C. according to the ASTM D 523 standard, of these coatings always has a value of less than 50%.

In addition, as has already been explained above, it is possible to obtain coatings having different levels of gloss depending on the amount of amorphous polyester and on the amount of semi-crystalline polyester that are used in these compositions.

By virtue of the present invention, it is therefore possible, after curing, to obtain coatings having the desired level of gloss simply by choosing a powder composition which contains the required proportions of amorphous polyester and of semi-crystalline polyester.

However, account should be taken of the fact that the nature of the crosslinking agent is also important with respect to the level of gloss of the coatings obtained after curing (see Example 11 below). A few preliminary tests will make it possible to easily determine the composition that is suitable for obtaining a coating which has the desired level of gloss.

As shown in greater detail in the examples which follow, it is therefore possible, by virtue of the present invention, to prepare powder paints and varnishes capable of providing coatings having the level of gloss required by the application envisaged, that is to say satin or semi-gloss coatings, the gloss of which, measured at an angle of 60° C. according to the ASTM D 523 standard, is less than 50%, or matt coatings, the gloss of which, measured under the same conditions, is less than 35%.

Furthermore, the thermosetting powder compositions according to the present invention are capable of producing low-gloss coatings having a combination of other advantageous properties, inter alia a smooth and uniform appearance, without any surface defects and free of "orange peel", good mechanical properties, and excellent weather-ability and UV resistance. The formation of a satin or matt finish is therefore not accompanied by a deterioration in the other properties of the coatings, as is often the case with powder compositions of the prior art that are capable of producing low-gloss coatings.

Finally, another important advantage of the thermosetting powder coating compositions according to the present invention over the powder compositions of the prior art resides in the fact that their properties are only slightly sensitive, or are insensitive, to variations in the extrusion conditions and that these compositions therefore make it possible to continually produce low-gloss, satin or matt coatings having substantially the same degree of gloss or of mattness.

The examples which follow illustrate the invention without limiting it. In these examples, certain characteristic values have been determined according to the methods described below:

- gloss: this is expressed as the intensity of the reflected light, in per cent, with respect to the intensity of the light incident at an angle of 60° and measured according to the ASTM D 523 standard;
- impact strength: this is measured by means of a Gardner apparatus according to the ASTM D 2794 standard. Cold-rolled steel panels provided with a cured coating are subjected to impacts of increasing intensity on the coated side (direct impact) and on the uncoated side (reverse impact). The highest impact that does not cause the coating to crack is measured in kg.cm;
- pencil hardness: this is determined by means of a WOLFF WILBRON hardness tester (ASTM D 3363 standard); the hardness measured is that of the hardest pencil that does not cause a notch in the coating according to a scale which goes from 6B (the softest pencil) to 6H (the hardest pencil);
- QUV accelerated ageing test: chromium-plated aluminium panels provided with a cured coating to be tested are placed in a "QUV Panel" test apparatus from the company Q-Panel Co. (Cleveland, USA), and subjected to several cycles of exposure to UV lamps and to moisture, at various temperatures. Among the various cycles of this type that are described in the ASTM G 53–88 standard, the coatings in the present case were subjected to a cycle of 8 hours' exposure to a fluorescent UVA lamp (340 nm wavelength and 0.77 W/m²/nm intensity) simulating the harmful effects of sunlight, at 60° C., and of 4 hours of water vapour condensation, with the lamp off, at 40° C.; the change in gloss, measured at an angle of 60°, according to the ASTM D 523 standard, is noted. After 3000 hours' exposure to this test, the gloss retention was determined from the equation:

$$\% \text{ retention} = \frac{60° \text{ gloss after 3000 hours' exposure}}{60° \text{ gloss at the start of the experiment}} \times 100\%$$

and also the colour change delta E, calculated according to the ASTM D 2244 standard;
- the acid number and the hydroxyl number were determined by titration according to the DIN 53402 and DIN 53240 standards and expressed in mg of KOH per gramme of polyester;
- the glass transition temperature ($T_g$) and the melting point ($T_m$) were determined by differential scanning calorimetry (DSC) at a scan rate of 20° C. per minute;
- the number-average molecular weight ($\overline{M}_n$) of the polyesters was determined from the equation:

$$\overline{M}_n = \frac{\text{functionality} \times 56,100}{N_A}$$

where $N_A$ is the acid number expressed in mg of KOH per gramme of polyester; and
- the melt viscosity of the polyesters, expressed in mPa·s, was measured by means of an ICI cone-and-plate viscometer according to the ASTM D 4287-88 standard; it is also called the "ICI viscosity" and was measured at the temperatures indicated in the examples.

Unless otherwise indicated, the parts mentioned in the examples are parts by weight.

EXAMPLE 1

Synthesis of Amorphous Polyesters a) One-Stage Synthesis

A mixture a 399.6 parts (3.84 mol) of neopentyl-glycol and 22.2 parts (0.16 mol) of trimethylol-propane is introduced into a 10 litre four-necked round-bottomed flask provided with a stirrer, a nitrogen influx and a distillation column connected to a water-cooled condenser and a thermometer attached to a temperature controller. The mixture is heated, with stirring and under nitrogen, to a temperature of approximately 130° C. and added to it are 722.9 parts (4.35 mol) of isophthalic acid and 2.5 parts of n-butyltin trioctanoate as esterification catalyst. The temperature of the reaction mixture is then gradually raised to 230° C. Water starts to distil from the reactor above 180° C. When the distillation of water at atmospheric pressure is completed, a vacuum of 50 mm Hg is gradually created. The temperature of the reaction mixture is maintained for 3 hours at 230° C. and at a pressure of 50 mm Hg.

Finally, the polyester obtained is left to cool to 180° C. and removed from the reactor. The polyester containing carboxyl groups thus obtained has the following characteristics:

Acid number: 32 mg of KOH/g

Hydroxyl number: 2 mg of KOH/g

ICI viscosity (at 200° C.): 8000 mPa·s

Glass transition temperature ($T_g$): 59° C. (DSC at 20° C./minute)

Number-average molecular weight ($\overline{M}_n$): 5423 (theoretical)

b) Two-Stage Synthesis

1st Stage:

A mixture of 423.5 parts (4.07 mol) of neopentylglycol and 22.2 parts (0.16 mol) of trimethylolpropane is introduced into a reactor as described at a) above. The mixture is heated with stirring and under nitrogen to a temperature of approximately 130° C. and added to it are 121.8 parts (0.733 mol) of terephthalic acid, 487.1 parts (2.93 mol) of isophthalic acid and 2.3 parts of n-butyltin trioctanoate as esterification catalyst.

The reaction is continued at 220° C. and under atmospheric pressure until approximately 95% of the theoretical amount of water is distilled. A transparent polyester containing hydroxyl groups is obtained which has the following characteristics:

Hydroxyl number: 59 mg of KOH/g

Acid number: 12 mg of KOH/g

ICI viscosity (at 175° C.): 2200 mPa·s

2nd Stage:

The polyester obtained at the first stage is left too cool to 200° C. and added to it are 110.9 parts (0.67 mol) of isophthalic acid. Next, the mixture is gradually heated to 230° C. The mixture is maintained at this temperature for 2 hours and, when the reaction mixture becomes clear, a vacuum of 50 mm Hg is gradually created. The reaction is continued for 3 hours at 230° C. and under a pressure of 50 mm Hg.

The polyester containing carboxyl groups thus obtained has the following properties:

Acid number: 31 mg of KOH/g

Hydroxyl number: 3 mg of KOH/g

ICI viscosity (at 200° C.): 6600 mPa·s

Glass transition temperature ($T_g$): 57° C. (DSC at 20° C./minute)

Number-average molecular weight ($\overline{M}_n$): 5423 (theoretical)

c) Yet another amorphous polyester containing carboxyl groups, rich in isophthalic acid, is prepared using the two-stage operating method described in b) above.

In the first stage, a polyester containing hydroxyl groups is prepared in the same way as in b) above from 423.5 parts (4.07 mol) of neopentyl-glycol, 304.5 parts (1.83 mol) of terephthalic acid, 304.5 parts (1.83 mol) of isophthalic acid and 2.3 parts of n-butyltin trioctanoate as esterification catalyst. The reaction is carried out under atmospheric pressure at 230° C. (instead of 220° C.).

The transparent polyester containing hydroxyl groups has the following characteristics:

Hydroxyl number: 57 mg of KOH/g

Acid number: 13 mg of KOH/g

ICI viscosity (at 175° C.): 1200 mPa·s

In the second stage, a polyester containing carboxyl groups is prepared in the same way as in b) above: 110.9 parts (0.67 mol) of isophthalic acid are added as in b) above.

The polyester containing carboxyl groups thus obtained has the following characteristics:

Acid number: 32 mg of KOH/g

Hydroxyl number: 2.1 mg of KOH/g

ICI viscosity (at 200° C.): 3000 mPa·s Glass transition temperature ($T_g$): 53° C. (DSC at 20° C./minute)

Number-average molecular weight ($\overline{M}_n$): 3740 (theoretical)

d) By way of comparison, an amorphous polyester containing carboxyl groups, rich in terephthalic acid, is also prepared according to the two-stage operating method described in b) above; it contains a minor amount of isophthalic acid (16.2 mol %) and a major amount of terephthalic acid (83.8 mol %).

In the first stage, a polyester containing hydroxyl groups is prepared in the same manner as in b) above from 417.8 parts (4.02 mol) of neopentylglycol, 600.7 parts (3.62 mol) of terephthalic acid and 2.2 parts of n-butyltin trioctanoate as esterification catalyst. The reaction is carried out under atmospheric pressure at 240° C. (instead of 220° C.).

The transparent polyester containing hydroxyl groups has the following characteristics:

Hydroxyl number: 61 mg of KOH/g

Acid number: 8 mg of KOH/g

ICI viscosity (at 200° C.): 1200 mPa·s

In the second stage, a polyester containing carboxyl groups is prepared in the same way as in b) above, but 117.1 parts (0.7 mol) of isophthalic acid are added (instead of 110.9 parts); the mixture is gradually heated to 240° C. (instead of 230° C.) and it is maintained at this temperature for 3 hours. When the reaction mixture becomes clear, a vacuum of 50 mm of Hg is gradually created and the reaction continued for 4 hours at 240° C. and under a pressure of 50 mm Hg. The polyester containing carboxyl groups thus obtained has the following characteristics:

Acid number: 33 mg of KOH/g

Hydroxyl number: 3 mg of KOH/g

ICI viscosity (at 200° C.): 4700 mPa·s

Glass transition tempera-ture ($T_g$): 57° C.

(DSC at 20°C./minute) Number-average molecular weight ($\overline{M}_n$): 3740 (theoretical)

The polyester obtained is left to cool to 200° C. and added to it are 1.3 parts of ethyltriphenyl-phosphonium bromide (crosslinking catalyst). After stirring the mixture for one hour, the polyester is removed from the reactor.

e) Another amorphous polyester containing carboxyl groups, rich in isophthalic acid, is prepared using the one-stage operating method described in a) above from 424.9 parts of neopentylglycol, 722.2 parts of isophthalic acid and 2.3 parts of n-butyltin trioctanoate as esterification catalyst. The polyester containing carboxyl groups thus obtained has the following characteristics:

Acid number: 31.5 mg of KOH/g

ICI viscosity (at 200° C.): 2900 mPa·s

Glass transition tempera-ture ($T_g$): 52° C.

(DSC at 20° C./minute)

EXAMPLE 2

Synthesis of Semicrystalline Polyesters.

a) A mixture of 739.9 parts (3.21 mol) of 1,12-dodecanedioic acid, 369.2 parts (3.12 mol) of 1,6-hexanediol and 2.5 parts of n-butyltin trioctanoate as esterification catalyst are introduced into a reactor as described in Example 1.

The mixture is heated, with stirring and under nitrogen, to a temperature of approximately 140° C., at which temperature the water starts to distil from the reactor. The temperature of the reaction mixture is then gradually raised to 225° C. When the distillation of water at atmospheric pressure is completed, 1.0 part of tributyl phosphite as stabilizer and 1.0 part of n-butyltin trioctanoate are added and a vacuum of 50 mm Hg is gradually created. The temperature of the reaction mixture is maintained for 3 hours at 225° C. and under a pressure of 50 mm Hg.

The semicrystalline polyester containing carboxyl groups thus obtained has the following characteristics:

Acid number: 11.5 mg of KOH/g

Hydroxyl number: 0.5 mg of KOH/g

ICI viscosity (at 150° C.): 7000 mPa·s

Melting point ($T_m$) (DSC at 20° C./minute): 67° C.

Number-average molecular weight ($\overline{M}_n$): 11220 (theoretical)

The polyester obtained is left to cool to 160° C. and added to it are 10 parts of TINUVIN 144 (light stabilizer) and 20 parts of TINUVIN 900 (UV light absorber). After stirring the mixture for one hour, the polyester is removed from the reactor, left to cool to ambient temperature and obtained in the form of a white solid substance.

b) Another semicrystalline polyester is prepared using the operating method described in a) above from 750.7 parts (3.26 mol) of 1,12-dodecanedioic acid, 353.7 parts (2.99 mol) of 1,6-hexanediol and 2.5 parts of n-butyltin trioctanoate as esterification catalyst.

The semicrystalline polyester containing carboxyl groups thus obtained has the following characteristics:

Acid number: 29.5 mg of KOH/g

Hydroxyl number: 0.6 mg of KOH/g

ICI viscosity (at 100° C.): 2000 mPa·s Melting point ($T_m$) (DSC at 20° C./minute): 65° C.

Number-average molecular weight ($\overline{M}_n$): 3740 (theoretical)

The polyester obtained is left to cool to 160° C. and added to it are 10 parts of TINUVIN 144 and 20 parts of TINUVIN 900. After stirring the mixture for one hour, the polyester is removed from the reactor, left to cool to ambient temperature and obtained in the form of a white solid substance.

c) Another semicrystalline polyester is prepared using the operating method described in a) above from 750.2 parts (3.25 mol) of 1,12-dodecanedioic acid, 351.2 parts (2.97 mol) of 1,6-hexanediol, 9.567 parts (0.07 mol) of trimethylolpropane and 2.5 parts of n-butyltin trioctanoate as esterification catalyst.

The semicrystalline polyester containing carboxyl groups thus obtained has the following characteristics:

Acid number: 21.3 mg of KOH/g

Hydroxyl number: 0.9 mg of KOH/g

ICI viscosity (at 100° C.): 4000 mPa·s Melting point ($T_m$) (DSC at 20° C./minute): 63° C.

Number-average molecular weight ($\overline{M}_n$): 7012 (theoretical)

The polyester obtained is left to cool to 160° C. and added to it are 10 parts of TINUVIN 144 and 20 parts of TINUVIN 900. After stirring the mixture for one hour, the polyester is removed from the reactor, left to cool to ambient temperature and obtained in the form of a white solid substance.

d) Another semicrystalline polyester is prepared using the operating method described in a) above from 897.4 parts (3.90 mol) of 1,12-dodecanedioic acid, 236.4 parts (3.81 mol) of ethylene glycol and 2.5 parts of n-butyltin trioctanoate as esterification catalyst.

The semicrystalline polyester containing carboxyl groups thus obtained has the following characteristics:

Acid number: 8.0 mg of KOH/g

Hydroxyl number: 2.5 mg of KOH/g

ICI viscosity (at 150° C.): 7200 mPa·s

Melting point ($T_m$) (DSC at 20° C./minute): 76° C.

Number-average molecular weight ($\overline{M}_n$): 11220 (theoretical)

The polyester obtained is left to cool to 160° C. and added to it are 10 parts of TINUVIN 144 and 20 parts of TINUVIN 900. After stirring the mixture for one hour, the polyester is removed from the reactor, left to cool to ambient temperature and obtained in the form of a white solid substance.

e) By way of comparison, a semicrystalline polyester containing carboxyl groups not according to the invention is also prepared in the following manner:

1st stage:

453.4 parts (3.84 mol) of 1,6-hexanediol are introduced into a reactor as described in Example 1. The contents of the reactor are heated up to 150° C. in order to melt the substance and added to it are 589.9 parts (3.55 mol) of terephthalic acid and 2.3 parts of n-butyltin trioctanoate as esterification catalyst. The reaction is continued at 235° C. under atmospheric pressure until approximately 95% of the theoretical amount of water is distilled. A polyester containing hydroxyl groups is obtained which has the following characteristics:

Hydroxyl number: 40 mg of KOH/g

Acid number: 5 mg of KOH/g

ICI viscosity (at 175° C.): 800 mPa·s 2nd stage:

The polyester obtained in the first stage is left to cool to 200° C. and added to it are 91.7 parts (0.55 mol) of isophthalic acid. Next, the mixture is gradually heated to 235° C. The mixture is maintained at this temperature for 2 hours, 1.0 part of tributylphosphite is added as stabilizer and a vacuum of 50 mm Hg is gradually created. The temperature of the reaction mixture is maintained for 2 hours at 235° C. under a pressure of 50 mm Hg. The semicrystalline polyester containing carboxyl groups thus obtained has the following characteristics:

Acid number: 32 mg of KOH/g

Hydroxyl number: 0.5 mg of KOH/g

ICI viscosity (at 150° C.): 7200 mPa·s Melting point ($T_m$) (DSC at 20° C./minute): 130° C.

Number-average molecular weight ($\overline{M}_n$): 3740 (theoretical)

The polyester obtained is left to cool to 160° C. and added to it are 10 parts of TINUVIN 144 and 20 parts of TINUVIN 900. After stirring the mixture for one hour, the polyester is removed from the reactor, left to cool to ambient temperature and obtained in the form of a white solid substance.

f) By way of comparison, yet another semicrystalline polyester is prepared in exactly the same way as in d) above from 458.24 parts (3.88 mol) of 1,6-hexanediol and 589.2 parts (3.55 mol) of terephthalic acid (in the first stage) and from 91.4 parts (0.62 mol) of adipic acid (in the second stage).

The semicrystalline polyester containing carboxyl groups thus obtained has the following characteristics:

Acid number: 34 mg of KOH/g

Hydroxyl number: 3 mg of KOH/g

ICI viscosity (at 200° C.): 700 mPa·s Melting point ($T_m$) (DSC at 20° C./minute): 129° C.

Number-average molecular weight ($\overline{M}_n$): 3400 (theoretical)

This semicrystalline polyester has the same characteristics as the semicrystalline polyester described in Example 1a of European Patent 521,992.

On completion of the synthesis, the polyester obtained is left to cool and added to it are 10 parts of TINUVIN 144 and 20 parts of TINUVIN 900. After stirring the mixture for one hour, the polyester is removed from the reactor, left to cool to ambient temperature and obtained in the form of a white solid substance.

g) Another semicrystalline polyester is prepared using the operating method described in a) above from 757.8 parts of 1,12-dodecanedioic acid, 351.2 parts of 1,4-cyclohexanediol and 2.5 parts of n-butyltin trioctanoate as esterification catalyst. The semicrystalline polyester containing carboxyl groups thus obtained has the following characteristics:

Acid number: 31.3 mg of KOH/g

ICI viscosity (at 150° C.): 1500 mPa·s

Melting point ($T_m$) (DSC at 20° C./minute): 65° C.

h) Another semicrystalline polyester is prepared using the operating method described in a) above from 700.1 parts of 1,12-dodecanedioic acid, 399.8 parts of 1,4-cyclohexanedimethanol and 2.5 parts of n-butyltin trioctanoate as esterification catalyst.

The semicrystalline polyester containing carboxyl groups thus obtained has the following characteristics:

Acid number: 33.4 mg of KOH/g

ICI viscosity (at 150° C.): 1500 mPa·s

Melting point ($T_m$) (DSC at 20° C./minute): 47° C.

Another semicrystalline polyester is prepared using the operating method described in a) above from 709.4 parts of 1,12-dodecanedioic acid, 369.74 parts of 1,4-cyclohexanedimethanol and 2.5 parts of n-butyltin trioctanoate as esterification catalyst.

The semicrystalline polyester containing carboxyl groups thus obtained has the following characteristics:

Acid number: 33.0 mg of KOH/g

ICI viscosity (at 150° C.): 3400 mPa·s

Melting point ($T_m$) (DSC at 20° C./minute): 45° C.

j) Another semicrystalline polyester is prepared using the operating method described in a) above from 500.7 parts of 1,12-dodecanedioic acid, 166.9 parts of adipic acid, 439.8 parts of 1,4-cyclohexanedimethanol and 2.5 parts of n-butyltin trioctanoate as esterification catalyst. The semicrystalline polyester containing carboxyl groups thus obtained has the following characteristics:

Acid number: 32.4 mg of KOH/g

ICI viscosity (at 150° C.): 1300 mPa·s

Melting point ($T_m$) (DSC at 20° C./minute): 45° C.

EXAMPLES 3 TO 15 AND COMPARATIVE EXAMPLES I, II and III

Preparation of Thermosetting Powder Coating Compositions

Sixteen thermosetting powder compositions are prepared in the following manner. An amorphous polyester containing carboxyl groups, prepared as described in Example 1, a semicrystalline polyester containing carboxyl groups, prepared as described in Example 2, a crosslinking agent and various auxiliary substances conventionally used for the manufacture of powder paints are dry blended at ambient temperature. The nature and the amounts of these substances are given in Table I below. The blend obtained is homogenized in a twin-screw extruder (PRISM, 16 mm, 15/1 L/D) at an extrusion temperature of 85° C. The extrudate is cooled, crushed and ground in a RETSCH ZM 100 mill (0.5 µm screen) and then screened in order to form a powder whose particle size is between 10 and 100 micrometres.

In order to determine the properties of the coatings obtained using these compositions, the powders obtained are deposited by spraying them with a Gema-Volstatic PCG 1 electrostatic spray gun on to cold-rolled steel panels under a voltage of 60 to 100 kV so as to obtain a film thickness of between 50 and 70 micrometres.

The panels thus coated are then transferred into an air-ventilated oven, where the compositions deposited are cured for 15 minutes at a temperature of 200° C.

The cured coatings obtained all have a smooth and uniform appearance and have no defects such as craters, pinholes or "orange peel".

The various compositions and the properties of the coatings obtained are described in Table I below.

TABLE I

| Composition (parts by weight) | Examples of white paints | | | | | | | | | | | | | | | |
|---|---|---|---|---|---|---|---|---|---|---|---|---|---|---|---|---|
| | 3 | 4 | 5 | 6 | 7 | 8 | 9 | 10 | 11 | 12 | 13 | 14 | 15 | I (1) | II (1) | III (1) |
| Amorphous polyester | | | | | | | | | | | | | | | | |
| of Example 1a | 423 | 446.4 | 441.6 | — | — | 441.6 | 446.4 | 474.3 | 427.3 | — | — | — | 512.9 | — | 446.4 | 446.4 |
| of Example 1b | — | — | — | 446.4 | — | — | — | — | — | — | — | — | — | — | — | — |
| of Example 1c | — | — | — | — | 423 | — | — | — | — | — | — | — | — | — | — | — |
| of Example 1d(1) | — | — | — | — | — | — | — | — | — | — | — | — | — | 446.4 | — | — |
| of Example 1e | — | — | — | — | — | — | — | — | — | 512.9 | 512.9 | 512.9 | — | — | — | — |
| Semicrystalline polyester | | | | | | | | | | | | | | | | |
| of Example 2a | 141 | 111.6 | 110.4 | 111.6 | 141 | — | — | — | 142.5 | — | — | — | — | 111.6 | — | — |
| of Example 2b | — | — | — | — | — | — | — | 83.7 | — | — | — | — | — | — | — | — |
| of Example 2c | — | — | — | — | — | 110.4 | — | — | — | — | — | — | — | — | — | — |
| of Example 2d | — | — | — | — | — | — | 111.6 | — | — | — | — | — | — | — | — | — |
| of Example 2e(1) | — | — | — | — | — | — | — | — | — | — | — | — | — | — | 111.6 | — |
| of Example 2f(1)(7) | — | — | — | — | — | — | — | — | — | — | — | — | — | — | — | 111.6 |
| of Example 2g | — | — | — | — | — | — | — | — | — | 128.5 | — | — | — | — | — | — |
| of Example 2h | — | — | — | — | — | — | — | — | — | — | 128.5 | — | — | — | — | — |
| of Example 2i | — | — | — | — | — | — | — | — | — | — | — | 128.5 | — | — | — | — |
| of Example 2j | — | — | — | — | — | — | — | — | — | — | — | — | 128.5 | — | — | — |
| Crosslinking agent A(2) | 36 | 42 | — | 42 | 36 | — | 42 | 42 | — | 48.3 | 48.3 | 48.3 | 48.3 | 42 | 42 | 42 |
| Crosslinking agent B(3) | — | — | 48 | — | — | 48 | — | — | — | — | — | — | — | — | — | — |
| Crosslinking agent C(4) | — | — | — | — | — | — | — | — | 30 | — | — | — | — | — | — | — |
| Titanium dioxide(5) | 300 | 300 | 300 | 300 | 300 | 300 | 300 | 300 | 300 | 296 | 296 | 296 | 296 | 300 | 300 | 300 |
| Fix F white | 100 | 100 | 100 | 100 | 100 | 100 | 100 | 100 | 100 | — | — | — | — | 100 | 100 | 100 |
| Flow-regulating agent(6) | 10 | 10 | 10 | 10 | 10 | 10 | 10 | 10 | 10 | 9.9 | 9.9 | 9.9 | 9.9 | 10 | 10 | 10 |
| Benzoin | 3.5 | 3.5 | 3.5 | 3.5 | 3.5 | 3.5 | 3.5 | 3.5 | 3.5 | 3.4 | 3.4 | 3.4 | 3.4 | 3.5 | 3.5 | 3.5 |
| BTC(8) | — | — | — | — | — | — | — | — | — | 1.0 | 1.0 | 1.0 | 1.0 | — | — | — |

TABLE I-continued

Examples of white paints

| Composition (parts by weight) | 3 | 4 | 5 | 6 | 7 | 8 | 9 | 10 | 11 | 12 | 13 | 14 | 15 | I (1) | II (1) | III (1) |
|---|---|---|---|---|---|---|---|---|---|---|---|---|---|---|---|---|
| Properties | | | | | | | | | | | | | | | | |
| 60° gloss | 18 | 29 | 23 | 25 | 34 | 29 | 28 | 44 | 49 | 40 | 35 | 49 | 48 | 81 | 84 | 86 |
| Impact strength (kg.cm) | | | | | | | | | | | | | | | | |
| direct | 200 | 200 | 80 | 140 | 180 | 100 | 160 | 120 | 200 | 100 | 100 | 200 | 140 | 160 | 40 | 60 |
| reverse | 200 | 200 | 100 | 160 | 180 | 120 | 160 | 120 | 200 | 100 | 80 | 200 | 140 | 160 | 20 | 40 |
| Pencil hardness | H | 2H | H | H | H | H | H | 2H | H | — | — | — | — | H | H | 2H |

(1)by way of comparison
(2)triglycidyl isocyanurate (ARALDITE PT 810 from Ciba-Geigy)
(3)75/25 mixture of diglycidyl terephthalate and triglycidyl trimellitate (ARALDITE PT 910 from Ciba-Geigy)
(4)bis(N,N-dihydroxyethyl)adipamide (PRIMID XL-552 from EMS)
(5)KRONOS 2310 (Ciba-Geigy)
(6)RESIFLOW PV5 (Worlée Chemie)
(7)Polyester described in Example 1a of European Patent 521,992
(8)Benzyltriphenylphosphonium chloride It may be seen that only the compositions according to the invention containing both an amorphous polyester rich in isophthalic acid and a semicrystalline polyester prepared from a saturated aliphatic dicarboxylic acid with a linear chain (1,12-dodecanedioic acid) and from a saturated aliphatic diol with a linear chain (1,6-hexanediol or ethylene glycol) or from a cycloaliphatic diol (1,4-cyclohexanediol or 1,4-cyclohexanedimethanol) give coatings whose gloss is less than 50%.

The composition of Comparative Example I, which contains an amorphous polyester rich in terephthalic acid, gives a coating which is very glossy (gloss of 81%).

Likewise, the compositions of Comparative Example II and of Example III which contain a semi-crystalline polyester not according to the invention, essentially based on terephthalic acid and 1,6-hexanediol (as in the illustrative embodiments in European Patent 521,992), give coatings which are very glossy (gloss of 84–86%). Furthermore, the coatings obtained from these compositions have an impact strength and a flexibility which are inferior.

It may also be seen that, when a polyepoxidized compound is used in the composition as crosslinking agent and when the amount of semicrystalline polyester increases (from 15 to 25% by weight) and the amount of amorphous polyester decreases (from 85 to 75% by weight with respect to the total weight of the polyesters), the gloss goes from 44 to 18% (compare Examples 10 and 3).

A coating may therefore be produced which has the desired level of gloss, either a matt coating (Examples 3 to 9) or a satin or semi-gloss coating (Examples 10 and 11), just by appositely choosing the powder composition which provides this level of gloss.

EXAMPLES 16 AND 17 AND COMPARATIVE EXAMPLES IV TO VI

Preparation of Thermosetting Powder Coating Compositions.

In these examples and comparative examples, 5 thermosetting powder compositions are prepared using the operating method described in the above Examples 3 to 15 for the purpose of obtaining dark brown paints and of testing the properties of the coatings obtained.

The various compositions and the properties of the coatings obtained are given in Table II below.

The cured coatings obtained from these compositions all have a smooth and uniform appearance and have no defects.

TABLE II

Examples of dark brown paints

| Composition (parts by weight) | 16 | 17 | IV (1) | V (1) | VI (1) |
|---|---|---|---|---|---|
| Amorphous polyester | | | | | |
| of Example 1a | — | 635.6 | — | 635.6 | 747.7 |
| of Example 1b | 598.2 | — | 598.2 | — | — |
| Semicrystalline polyester | | | | | |
| of Example 2a | — | 112.2 | — | — | — |
| of Example 2b | 149.5 | — | — | — | — |
| of Example 2e(1) | — | — | 149.5 | 112.2 | — |
| Crosslinking agent A(2) | 56.3 | 56.3 | 56.3 | 56.3 | 56.3 |
| Black iron oxide(3) | 45 | 45 | 45 | 45 | 45 |
| Black iron oxide(4) | 140 | 140 | 140 | 140 | 140 |
| Carbon black(5) | 11 | 11 | 11 | 11 | 11 |
| Flow-regulating agent(6) | 10 | 10 | 10 | 10 | 10 |
| Benzoin | 3.5 | 3.5 | 3.5 | 3.5 | 3.5 |
| Properties | | | | | |
| 60° gloss | 32 | 44 | 85 | 90 | 87 |
| Impact resistance (kg · cm) | | | | | |
| direct | 100 | 180 | 120 | 60 | 0 |
| reverse | 100 | 200 | 120 | 40 | 0 |
| Pencil hardness | H | 2H | H | 2H | 2H |

(1)by way of comparison
(2)triglycidyl isocyanurate (ARALDITE PT 810 by Ciba-Geigy)
(3)BAYFERROX 130 (Bayer)
(4)BAYFERROX 3950 (Bayer)
(5)FW 2 (Degussa)
(6)RESIFLOW PV5 (Worlée Chemie)

Table II shows that the compositions according to the invention (Examples 16 and 17) give low-gloss coatings while the compositions not according to the invention (Comparative Examples IV and V), which contain a semicrystalline polyester essentially based on terephthalic acid and 1,6-hexanediol, give very glossy coatings (gloss of 85 to 90%).

EXAMPLES 18

Weatherability of the Coatings.

In this example, the excellent weather behaviour of the low-gloss coatings obtained from compositions according to the invention is demonstrated.

For this purpose, the coatings obtained with the dark brown paints prepared in Examples 16 and 17 and Comparative Examples IV, V and VI (the compositions of which are given in Table II) were tested with respect to their weatherability.

The powder paints to be tested are deposited by spraying them using a Gema-Volstatic PCG 1 electro-static spray gun onto chromium-plated aluminium panels under a voltage of 60 to 100 kV. The thickness of the coating deposited is from 50 to 70 micrometers.

After curing for 15 minutes at 200° C., the coatings obtained are subjected to the accelerated ageing test (the QUV test described above) so as to determine the UV resistance and moisture resistance. The colour change delta E was determined according to the ASTM D 2244 standard and the retention of the gloss, measured at an angle of 60° C., was determined according to the ASTM D 523 standard after 3000 hours' exposure.

The results thus obtained are given in Table III in which:
first column indicates the composition tested
second column the colour change delta E calculated according to the ASTM D 2244 standard after 3000 hours' exposure third column the retention of the gloss, measured at an angle of 60° C., according to the ASTM D 523 standard after 3000 hours' exposure and expressed as a percentage of its initial value at the start of the experiment.

TABLE III

Accelerated ageing of the coatings

| Composition | Delta E | Retention of the gloss (%) |
| --- | --- | --- |
| of Example 16 | 5.3 | 63 |
| of Example 17 | 3.5 | 82 |
| of Example IV[(1)] | 16.8 | 32 |
| of Example V[(1)] | 15.1 | 41 |
| of Example VI[(1)] | 4.8 | 92 |

[(1)]by way of comparison.

The results in Table III show that the low-gloss coatings obtained from the compositions according to the invention exhibit remarkably good weatherability (Examples 16 and 17).

This weatherability is comparable to that obtained with compositions based on amorphous polyesters rich in isophthalic acid that are commercially available and reknowned for their excellent outdoor exposure performance (Comparative Example VI). The presence of the semicrystalline polyester based on 1,12-dodecanedioic acid and 1,6-hexanediol in the compositions according to the invention hardly affects the weatherability of the cured coatings obtained.

It may be seen in Table III that the same does not apply with regard to the compositions of the prior art which contain a semicrystalline polyester of the type of those used in the illustrative embodiments of European Patent 521,992, which are based essentially on terephthalic acid and 1,6-hexanediol. This is because the coatings obtained with these compositions are extensively damaged by exposing them to UV lamps and to moisture: the colour change delta E is very significant and the gloss falls below 50% of its initial value after 3000 hours' exposure (Comparative Examples IV and V).

What is claimed is:

1. A thermosetting powder coating composition that, when cured, results in a coating having a gloss of less than 50% measured at an angle of 60° according to ASTM D 523 standard, wherein the composition comprises a binder, wherein the binder comprises a blend of
    (a) an amorphous polyester containing carboxyl groups, rich in isophthalic acid, prepared from an acid constituent comprising from 55 to 100 mol % of isophthalic acid, from 0 to 45 mol % of at least one dicarboxylic acid other than isophthalic acid and from 0 to 10 mol % of a polycarboxylic acid containing at least 3 carboxyl groups and from an alcohol constituent comprising from 60 to 100 mol % of neopentylglycol, from 0 to 40 mol % of at least one dihydroxylated compound other than neopentylglycol and from 0 to 10 mol % of a polyhydroxylated compound containing at least 3 hydroxyl groups, the said amorphous polyester having a glass transition temperature ($T_g$) of at least 50° C. and an acid number of 15 to 100 mg of
    (b) a semicrystalline polyester containing carboxyl groups prepared either
        (b1) from 1,12-dodecanedioic acid and from a saturated aliphatic diol with a linear chain having from 2 to 16 carbon atoms and optionally from a polycarboxylic acid containing at least 3 carboxyl groups or from a polyol containing at least 3 hydroxyl groups, or
        (b2) from 40 to 100 mol % of 1,12-dodecanedioic acid and from 0 to 60 mol % of an aliphatic dicarboxylic acid with a linear chain having from 4 to 9 carbon atoms, calculated with respect to the total of the dicarboxylic acids, from a cycloaliphatic diol having from 3 to 16 carbon atoms and optionally from a polycarboxylic acid having at least 3 carboxyl groups or from a polyol having at least 3 hydroxyl groups,
    the said semicrystalline polyester having a melting point ($T_m$) of at least 40° C. and an acid number of 5 to 50 mg of KOH/g; and
    (c) a crosslinking agent.

2. A composition according to claim 1, wherein the amorphous polyester (a) has a glass transition temperature of 50 to 80° C. and an acid number of 30 to 70 mg of KOH per gram.

3. A composition according to claim 1, wherein the amorphous polyester (a) has at least one of the following characteristics: a number-average molecular weight of between 1100 and 11,500 and a melt viscosity of 100 to 15,000 mPa·s at 200° C.

4. A composition according to claim 1, wherein the acid constituent of the amorphous polyester (a) contains, apart from isophthalic acid, up to 45 mol % of a dicarboxylic acid chosen from terephthalic acid, phthalic acid, succinic acid, glutaric acid, adipic acid, pimelic acid, suberic acid, azelaic acid, sebacic acid, fumaric acid, maleic acid, 1,3-cyclohexanedicarboxylic acid, 1,4-cyclohexanedicarboxylic acid and mixtures of these compounds.

5. A composition according to claim 1, wherein the alcohol constituent of the amorphous polyester (a) contains, apart from neopentylglycol, up to 40 mol % of a dihydroxylated compound chosen from ethylene glycol, propylene glycol, 1,4-butanediol, 1,6-hexanediol, 2-methyl-1,3-propanediol, 2-butyl-2-ethyl-1,3-propanediol, 1,4-cyclohexanedimethanol, hydrogenated bisphenol A, neopentylglycol hydroxypivalate and mixtures of these compounds.

6. A composition according to claim 1, wherein the semicrystalline polyester (b) has a melting point of between 40 and 90° C., an acid number of 5 to 30 mg of KOH per gram and a hydroxyl number which does not exceed 5 mg of KOH per gram.

7. A composition according to claim 1, wherein the semicrystalline polyester (b) has at least one of the following characteristics: a number-average molecular weight of between 2200 and 25,000 and a melt viscosity of from 50 mPa·s at 100° C. to 10,000 mPa·s at 150° C.

8. A composition according to claim 1, wherein the semicrystalline polyester (b1) is the polyesterification product of 1,12-dodecanedioic acid with 1,6-hexanediol.

9. A composition according to claim 1, wherein the semicrystalline polyester (b2) is the polyesterification product of 1,12-dodecanedioic acid with 1,4-cyclohexanediol or 1,4-cyclohexanedimethanol.

10. A composition according to claim 1, wherein the amount of amorphous polyester (a) represents approximately 60 to 87% by weight and the amount of semicrystalline polyester (b) represents approximately 13 to 40% by weight calculated with respect to the total weight of the amorphous polyester (a) and of the semicrystalline polyester (b).

11. A composition according to claim 1, wherein the amount of amorphous polyester represents 60 to 82% by weight and the amount of semicrystalline polyester (b) represents 18 to 40% by weight calculated with respect to the total weight of the amorphous polyester (a) and of the semicrystalline polyester (b).

12. A composition according to claim 1, wherein the crosslinking agent (c) is a polyepoxidized compound.

13. A composition according to claim 1, wherein the crosslinking agent (c) is a beta-hydroxyalkylamide.

14. A composition according to claim 1, wherein the ratio of the amount of amorphous polyester (a) and of semicrystalline polyester (b) containing carboxyl groups, on the one hand, to the amount of crosslinking agent (c), on the other hand, is such that there are from 0.5 to 1.5 equivalents of carboxyl groups per equivalent of functional groups in the crosslinking agent.

15. A composition according to claim 1, wherein the crosslinking agent (c) is present in an amount of approximately 4 to 25% by weight calculated with respect to the total weight of the binder.

16. A composition according to claim 1, wherein the binder comprises from 45 to 83% by weight of amorphous polyester (a), from 13 to 30% by weight of semicrystalline polyester (b) and from 4 to 25% by weight of crosslinking agent (c).

17. A composition according to claim 1, wherein the binder comprises from 45 to 78% by weight of amorphous polyester (a), from 18 to 30% by weight of semicrystalline polyester (b) and 4 to 25% by weight of crosslinking agent (c).

18. A varnish or paint, comprising a thermosetting powder composition according to claim 1, together with auxiliary substances acceptable for use in the powder varnish or paint.

19. A satin or matt coating, comprising a cured thermosetting powder composition according to claim 1.

20. A process for obtaining a low-gloss coating on an article, which comprises applying a thermosetting powder coating composition according to claim 1 to the article and curing the article thus coated at a temperature of 140 to 200° C.

21. An article entirely or partially coated using the process according to claim 20.

22. A process according to claim 20, wherein the article thus coated is cured at a temperature of 140 to 200° C. for up to 30 minutes.

* * * * *

UNITED STATES PATENT AND TRADEMARK OFFICE
CERTIFICATE OF CORRECTION

PATENT NO.   : 6,660,398 B1
DATED        : December 9, 2003
INVENTOR(S)  : Moens et al.

It is certified that error appears in the above-identified patent and that said Letters Patent is hereby corrected as shown below:

<u>Column 24,</u>
Line 22, after "15 to 100 mg of" insert -- KOH/g; --.

Signed and Sealed this

Sixteenth Day of March, 2004

JON W. DUDAS
*Acting Director of the United States Patent and Trademark Office*